US012807788B2

(12) United States Patent
Park et al.

(10) Patent No.: US 12,807,788 B2
(45) Date of Patent: Nov. 24, 2026

(54) SURFACE-TREATED INORGANIC NANOPARTICLE AND COMPOSITE FILM INCLUDING THE SAME

(71) Applicant: SAMSUNG ELECTRO-MECHANICS CO., LTD., Suwon-si (KR)

(72) Inventors: Seong Chan Park, Suwon-si (KR); Jung Hyun Lee, Suwon-si (KR); Eun Jung Lim, Suwon-si (KR); Young O Kim, Suwon-si (KR); Chang Hyun Yoon, Suwon-si (KR); Choon Keun Lee, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 819 days.

(21) Appl. No.: 18/089,688

(22) Filed: Dec. 28, 2022

(65) Prior Publication Data

US 2023/0365785 A1 Nov. 16, 2023

(30) Foreign Application Priority Data

May 10, 2022 (KR) ........................ 10-2022-0056969
Jun. 23, 2022 (KR) ........................ 10-2022-0076837

(51) Int. Cl.
*C08K 9/04* (2006.01)
*C08J 5/18* (2006.01)
(Continued)

(52) U.S. Cl.
CPC *C08K 9/04* (2013.01); *C08J 5/18* (2013.01); *C08K 3/22* (2013.01); *C08K 3/30* (2013.01);
(Continued)

(58) Field of Classification Search
CPC ... C08K 9/04; C08K 3/22; C08K 3/30; C08K 2003/2206; C08K 2003/2241;
(Continued)

(56) References Cited

U.S. PATENT DOCUMENTS 8,663,801 B1 * 3/2014 Lee ........................ B01J 21/063
977/773
10,962,703 B1 * 3/2021 Lane .................... G02B 6/0065
(Continued)

FOREIGN PATENT DOCUMENTS

CN 107614614 A 1/2018
CN 109776843 A * 5/2019
(Continued)

OTHER PUBLICATIONS

Kato et al., Relationship between degree of polymerization and optical and thermal properties of fluorene in polycarbonate polymers, 2017, Journal of Applied Polymer Science, 134, 45042 (Year: 2017).*

(Continued)

*Primary Examiner* — Robert S Jones, Jr.
*Assistant Examiner* — Caitlin Norine Illing
(74) *Attorney, Agent, or Firm* — NSIP Law

(57) ABSTRACT

A surface-treated inorganic nanoparticle including an inorganic nanoparticle, a first dispersant connected to the inorganic nanoparticle, and a second dispersant connected to the inorganic nanoparticle, wherein a molecular weight (MW) of the first dispersant is different from a molecular weight (MW) of the second dispersant.

9 Claims, 9 Drawing Sheets

(51) Int. Cl.

| | |
|---|---|
| ***C08K 3/22*** | (2006.01) |
| ***C08K 3/30*** | (2006.01) |
| ***G02B 1/04*** | (2006.01) |
| *B82Y 30/00* | (2011.01) |
| *B82Y 40/00* | (2011.01) |

(52) U.S. Cl.

CPC .............. *G02B 1/041* (2013.01); *B82Y 30/00* (2013.01); *B82Y 40/00* (2013.01); *C08J 2367/00* (2013.01); *C08J 2369/00* (2013.01); *C08K 2003/2206* (2013.01); *C08K 2003/2241* (2013.01); *C08K 2003/2244* (2013.01); *C08K 2003/3036* (2013.01); *C08K 2201/005* (2013.01)

(58) Field of Classification Search

CPC .... C08K 2003/2244; C08K 2003/3036; C08K 2201/005; C08J 5/18; C08J 2367/00; C08J 2369/00; G02B 1/041; B82Y 30/00; B82Y 40/00

See application file for complete search history.

(56) References Cited

U.S. PATENT DOCUMENTS

| | | | | |
|---|---|---|---|---|
| 12,195,622 | B2 * | 1/2025 | Maekawa | C08G 64/0291 |
| 2014/0213725 | A1 * | 7/2014 | Yamazaki | C07F 9/1658 549/22 |
| 2016/0049559 | A1 | 2/2016 | Li et al. | |
| 2017/0009062 | A1 * | 1/2017 | Kimura | C08K 9/06 |
| 2018/0171159 | A1 * | 6/2018 | Ooi | B22F 1/0545 |

FOREIGN PATENT DOCUMENTS

| | | | |
|---|---|---|---|
| JP | 2008044835 | A * | 2/2008 |
| JP | 4273959 | B2 | 6/2009 |
| JP | 2009-298995 | A | 12/2009 |
| JP | 2014-198646 | A | 10/2014 |
| JP | 2014-213305 | A | 11/2014 |
| KR | 10-2014-0119998 | A | 10/2014 |
| KR | 10-2015-0140720 | A | 12/2015 |
| KR | 10-2019-0081089 | A | 7/2019 |

OTHER PUBLICATIONS

Sakurai et al., Optical Properties of a Low Birefringence Polyester Containing Fluorene Side Chain I, Jan. 14, 2000, Polymer Journal, vol. 32, p. 676-682 (Year: 2000).*

CN109776843A machine translation (Year: 2019).*

JP2008044835A machine translation (Year: 2008).*

Taiwanese Office Action Issued on Sep. 18, 2024, in Counterpart Taiwanese Patent Application No. 112100078 (12 Pages in English, 9 Pages in Chinese).

Korean Office Action issued on May 27, 2024, in counterpart Korean Patent Application No. 10-2022-0076837 (9 pages in English, 8 pages in Korean).

* cited by examiner

100A

100B (a)

(b)

(c)

(d)

SURFACE-TREATED INORGANIC NANOPARTICLE AND COMPOSITE FILM INCLUDING THE SAME

CROSS-REFERENCE TO RELATED APPLICATIONS

This application claims the benefit under 35 USC 119(a) of Korean Patent Application No. 10-2022-0056969 filed on May 10, 2022, and Korean Patent Application No. 10-2022-0076837 filed on Jun. 23, 2022, in the Korean Intellectual Property Office, the entire disclosures of which are incorporated herein by reference for all purposes.

BACKGROUND

1. Field

The present disclosure relates to a surface-treated inorganic nanoparticle and a composite film including the same, and may be used, for example, in an optical lens of a camera module.

2. Description of the Background

Optical properties of a material of a camera lens may be classified as refractive index, birefringence, Abbe number, transmittance, or the like, and it is important to design the same to be advantageous for each of the properties. The refractive index may be important, and as the refractive index increases, the lens may be made thinner, and resolution thereof may be increased. Accordingly, this may be a characteristic of consideration in development of a material of the lens.

In order to manufacture a camera lens having a high refractive index, an inorganic material such as glass, or a high refractive polymer may be used. Since a polymer may be light, may not break easily, and may be inexpensive in terms of price, the material may have an advantage, as compared to inorganic material. In addition, since a range of a refractive index may be adjusted according to a chemical structure of the polymer, the polymer may be used as an optical material according to the purpose.

However, there may be a limit to increasing the refractive index by changing the chemical structure of a polymer.

The above information is presented as background information only to assist with an understanding of the present disclosure. No determination has been made, and no assertion is made, as to whether any of the above might be applicable as prior art with regard to the disclosure.

SUMMARY

This Summary is provided to introduce a selection of concepts in simplified form that are further described below in the Detailed Description. This Summary is not intended to identify key features or essential features of the claimed subject matter, nor is it intended to be used as an aid in determining the scope of the claimed subject matter.

In one general aspect, a surface-treated inorganic nanoparticle includes an inorganic nanoparticle; a first dispersant connected to the inorganic nanoparticle; and a second dispersant connected to the inorganic nanoparticle, wherein a molecular weight (MW) of the first dispersant is different from a molecular weight (MW) of the second dispersant.

A first surface-treatment layer may be disposed on the inorganic nanoparticle, and a second surface-treatment layer may be disposed on the first surface-treatment layer.

The first and second surface-treatment layers may include the first and second dispersants, respectively, and a portion of the second dispersant may pass through the first surface-treatment layer.

The molecular weight (MW) of the first dispersant may be lower than the molecular weight (MW) of the second dispersant.

The molecular weight (MW) of the first dispersant may be 800 to 1800.

The first and second dispersants may include a compound including a chain having a repeating unit and a terminal group connected to an end of the chain, respectively, and the compound included in each of the first and second dispersants may have different chain lengths.

The repeating unit of the chain may include an aliphatic chain.

The chain may include polyethylene or polyoxazoline, and the terminal group may include a silane structure, a phosphate structure, or a carboxyl structure.

The first dispersant may include a structure derived from a compound represented by the following Formula 1 or a compound represented by Formula 2:

[Formula 1]

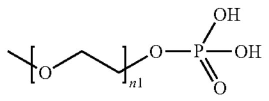

[Formula 2]

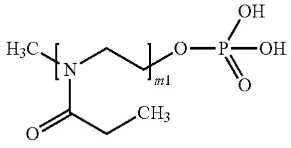

where n1 is an integer of 15 to 50, and m1 is an integer of 5 to 35.

The second dispersant may include a structure derived from a compound represented by the following Formula 3 or a compound represented by Formula 4:

[Formula 3]

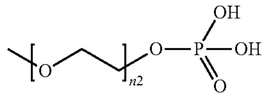

[Formula 4]

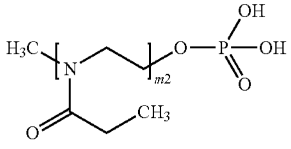

where n2 is an integer of 110 to 260, and m2 is an integer of 110 to 230.

The inorganic nanoparticle may include zirconia ($ZrO_2$), titania ($TiO_2$), barium titanate (BTO), or zinc sulfide (ZnS).

A particle size of the surface-treated inorganic nanoparticle may be 3 nm to 15 nm.

A lens may include the surface-treated inorganic nanoparticle.

In another general aspect, a film includes a polymer, and a surface-treated inorganic nanoparticle dispersed in the polymer, wherein the surface-treated inorganic nanoparticle includes an inorganic nanoparticle, a first dispersant connected to the inorganic nanoparticle, and a second dispersant connected to the inorganic nanoparticle, wherein a molecular weight (MW) of the first dispersant is different from a molecular weight (MW) of the second dispersant.

When a molecular weight (MW) of the polymer is P and a molecular weight (MW) of the second dispersant is N, P/N may be 1 to 4.

The molecular weight (MW) of the polymer may be 10000 to 30000.

The polymer may include polyester containing fluorene, or polycarbonate containing fluorene.

A lens may include the film.

In another general aspect, a material includes nanoparticles dispersible in a polymer, wherein the nanoparticles include a short chain dispersant forming a first surface layer, and a long chain dispersant forming a second surface layer and passing through the first surface layer, wherein the molecular weight (MW) of the long chain dispersant is in a range of 5000 to 240000 and the molecular weight (MW) of the short chain dispersant is in a range of 2000 or less.

A lens may include the material dispersed in a polymer wherein the first surface layer and the second surface layer may be disposed on an inorganic nanoparticle, and wherein the molecular weight (MW) of the polymer may be in a range of 10000 to 30000.

Other features and aspects will be apparent from the following detailed description, the drawings, and the claims.

BRIEF DESCRIPTION OF DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

Figure 1:
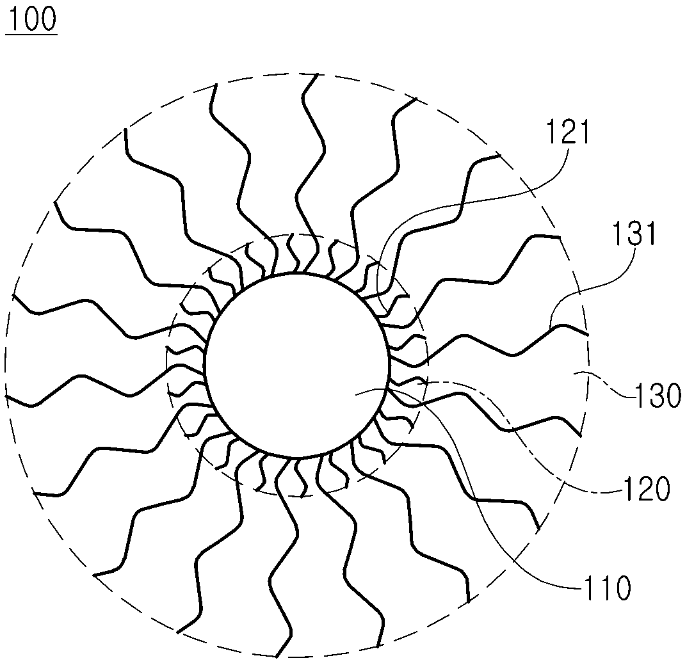
FIG. 1 schematically illustrates an example of a surface-treated inorganic nanoparticle.

Hereinafter, while example embodiments the present disclosure will be described in detail with reference to the accompanying drawings as follows, it is noted that examples are not limited to the same.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of this disclosure. For example, the sequences of operations described herein are merely examples, and are not limited to those set forth herein, but may be changed as will be apparent after an understanding of this disclosure, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of this disclosure.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Herein, it is noted that use of the term "may" with respect to an example or embodiment, e.g., as to what an example or embodiment may include or implement, means that at least one example or embodiment exists in which such a feature is included or implemented while all examples and examples are not limited thereto.

Throughout the specification, when an element, such as a layer, region, or substrate is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items; likewise, "at least one of" includes any one and any combination of any two or more of the associated listed items.

Spatially relative terms, such as "above," "upper," "below," "lower," and the like, may be used herein for ease of description to describe one element's relationship to another element as illustrated in the figures. Such spatially relative terms are intended to encompass different orientations of the device in use or operation in addition to the orientation depicted in the figures. For example, if the device in the figures is turned over, an element described as being "above," or "upper" relative to another element would then be "below," or "lower" relative to the other element. Thus, the term "above" encompasses both the above and below orientations depending on the spatial orientation of the device. The device may also be oriented in other manners (for example, rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Due to manufacturing techniques and/or tolerances, variations of the shapes illustrated in the drawings may occur. Thus, the examples described herein are not limited to the specific shapes illustrated in the drawings, but include changes in shape occurring during manufacturing.

According to example embodiments of the present disclosure described herein, the refractive index of a polymer may be increased by incorporating a high refractive nanoparticle into a polymer matrix.

An aspect of the present disclosure is to provide a surface-treated inorganic nanoparticle that may be uniformly distributed in an optical polymer, and a composite film in which the surface-treated inorganic nanoparticle is dispersed in an optical polymer, for example, a composite film for an optical lens of a camera module.

One of several solutions proposed in the present disclosure is to modify an inorganic nanoparticle to have a multi-surface-treatment structure, such as a double surface-treatment structure, using a plurality of dispersants having different molecular weights (MW).

Surface-Treated Inorganic Nanoparticle

A high refractive optical polymer having various advantages may be used to manufacture a camera lens with a high refractive index, but there is a limit to increasing the refractive index by changing a chemical structure of the polymer. Therefore, it is necessary to increase the refractive index by incorporating a high refractive nanoparticle into a polymer matrix.

In this case, a nanoparticle such as zirconium oxide and titanium oxide should be smaller than a minimum wavelength of light to reduce light scattering, and thus should be prepared with a uniform diameter of 15 nm or less. In addition, to prevent a decrease in intensity of transmitted light due to Rayleigh scattering and to effectively increase a refractive index of a composite film, the nanoparticle should be evenly dispersed in the polymer matrix.

A composite film used for optics may be prepared by mixing the nanoparticle with a thermosetting polymer or a thermoplastic polymer. A composite film of the nanoparticle and the thermosetting polymer may be prepared by mixing an acrylic liquid monomer and the nanoparticle and then polymerizing the mixture. In this case, a surface of the nanoparticle may react with acryl, and may be modified into a molecule having a structure similar to that of acryl, to increase miscibility of two heterogeneous materials.

In addition, to incorporate the nanoparticle using the thermoplastic polymer, a method of mixing the polymer and the nanoparticle in a molten state by applying heat, or a method of dissolving both the polymer and the nanoparticle in a solvent and then removing the solvent may be used. In addition, to increase affinity of an interface between the two heterogeneous materials and to evenly disperse the nanoparticle in the solvent, a surface of the nanoparticle may be modified with a dispersant.

In particular, as a thermoplastic polymer for optics, cyclic olefin, polyester, polycarbonate, or the like may be used. Among them, polyester and polycarbonate containing a large number of aromatic rings in a high-volume ratio may be used as a high refractive thermoplastic polymer. Among the aromatic rings, since fluorene does not cause birefringence due to structural characteristics thereof, it may be advantageous for use as an optical lens. Therefore, to increase affinity of an interface between the thermoplastic polymer having a fluorene group and the nanoparticle, for example, a zirconia nanoparticle having a hydrophilic surface, it may be necessary to design a chemical structure of a dispersant suitable for this structure.

When a surface of the nanoparticle is treated only with a dispersant having a small molecular weight, aggregation with the nanoparticle may be controlled. Since the dispersant does not mix with a matrix polymer, phase separation may occur, and an opaque composite film may be prepared. In addition, when a surface of the nanoparticle is treated only with a dispersant having a large molecular weight, miscibility with the polymer may be improved, but aggregation between nanoparticles may not be suppressed because a fixed density is lowered.

From this point of view, a surface-treated inorganic nanoparticle 100 according to an example may include an inorganic nanoparticle 110, a first dispersant 121 connected to the inorganic nanoparticle 110, and a second dispersant 131 connected to the inorganic nanoparticle 110, as illustrated in FIG. 1. Each of the first and second dispersants 121 and 131 may be connected to the inorganic nanoparticle 110 by a covalent bond, and a portion of each of the first and second dispersants 121 and 131 may be connected to the inorganic nanoparticle 110 by a hydrogen bond. A molecular weight (MW) of the first dispersant may be different from a molecular weight (MW) of the second dispersant. In the present disclosure, the molecular weight (MW) may be a number average molecular weight, and, for example, may be measured using Gel Permeation Chromatography (GPC) of AGILENT's 1200 series model.

More specifically, a first surface-treatment layer 120 may be disposed on the inorganic nanoparticle 110, a second surface-treatment layer 130 may be disposed on the first surface-treatment layer 120, and the first and second surface-treatment layers 120 and 130 may include first and second dispersants 121 and 131, respectively. A portion of the second dispersant 131 may pass through the first surface-treatment layer 120.

In this manner, a plurality of the dispersants 121 and 131 having different molecular weights (MW) may be used to modify the inorganic nanoparticle 110 into a structure having multiple surface-treatment layers 120 and 130, to obtain the surface-treated inorganic nanoparticle 100. When dispersing the surface-treated inorganic nanoparticle 100 in a polymer, it is possible to solve the mutually exclusive problems described above, such as improving miscibility with the polymer at the same time while suppressing aggregation of nanoparticles, or the like.

Figure 2:
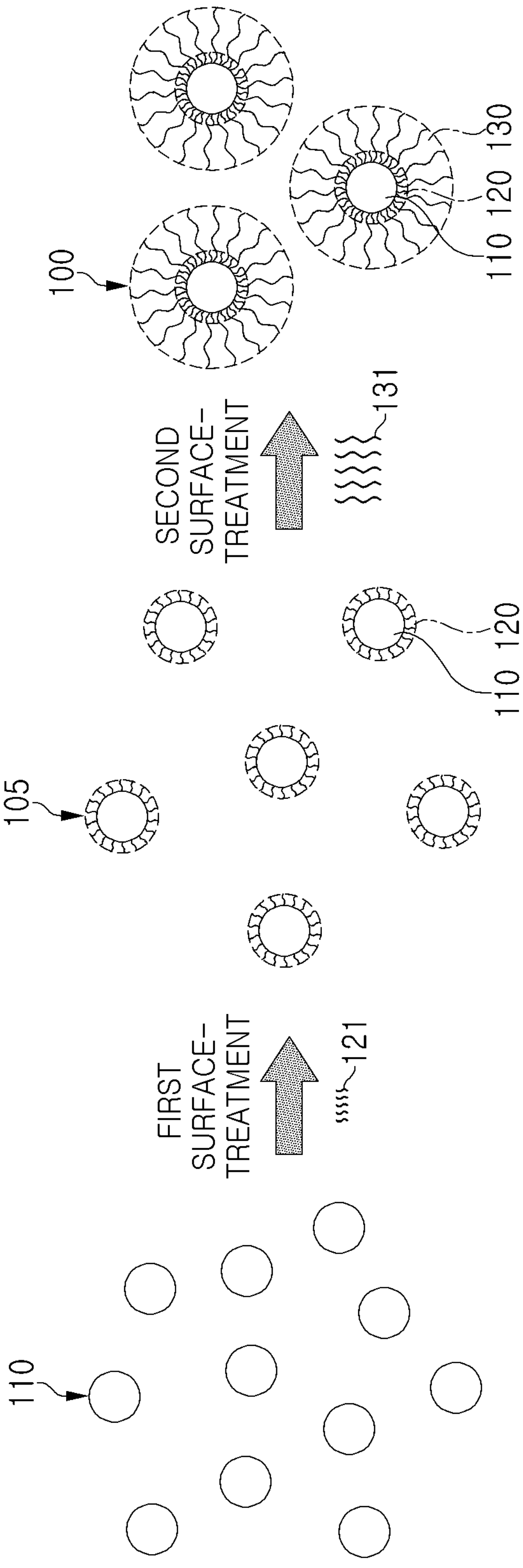
FIG. 2 schematically illustrates an example of a surface-treatment process of an inorganic nanoparticle.

As illustrated in FIG. 2, such a surface-treated inorganic nanoparticle 100 may be acquired by performing first surface-treatment of an inorganic nanoparticle 110 with a first dispersant 121 to obtain a first surface-treated inorganic nanoparticle 105, and performing second surface-treatment of the first surface-treated inorganic nanoparticle 105 with a second dispersant 131, but the present disclosure is not limited thereto.

A molecular weight (MW) of the first dispersant 121 may be lower than a molecular weight (MW) of the second dispersant 131. For example, the first dispersant 121 may have a molecular weight (MW) of 2000 or less, for example, about 800 to 1800, and the second dispersant 131 may have a molecular weight (MW) higher than the above. The molecular weight (MW) of the second dispersant 131 may have a relative range with respect to a molecular weight (MW) of a matrix polymer of a composite film to be described later. In this case, it is preferable to solve the above-mentioned mutually exclusive problem.

The molecular weight (MW) of each of the first and second dispersants 121 and 131 may be changed, depending on a repeating unit of a chain included in each compound therein. As the number of repeating units increases, a length of the chain may become longer, and thus the molecular weight (MW) may also increase. For example, a repeating unit of a chain of a compound included in the first dispersant 121 may be smaller than a repeating unit of a chain of a compound included in the second dispersant 131, and thus the chain may have a shorter length. Therefore, a thickness of a first surface-treatment layer 120 may be thinner than a thickness of a second surface-treatment layer 130.

Hereinafter, each component included in a surface-treated inorganic nanoparticle 100 according to an example will be described in more detail.

The inorganic nanoparticle 110 is not particularly limited as long as having high refractive properties, and may include, for example, a nanoparticle such as zirconia ($ZrO_2$), titania ($TiO_2$), barium titanate (BTO), or zinc sulfide (ZnS), or the like.

Each of the first and second dispersants 121 and 131 may include a compound including a chain having a repeating unit and a terminal group connected to an end of the chain, respectively. The repeating unit of the chain may include an aliphatic chain, and may also include an ether group (—O—) or an amide group (—N(—C(=O)—R)—), linked to the aliphatic chain. The terminal group may include a functional group capable of forming a chemical bond, for example, a covalent bond, with the inorganic nanoparticle 110.

In the present disclosure, for convenience of description, the dispersants may be described without distinguishing between before and after forming a covalent bond with the inorganic nanoparticle. This may be because a hydrogen bond retains a portion of the dispersants without a covalent bond with the inorganic nanoparticle. In this case, a structure of the terminal group of the dispersant before and after forming a covalent bond with the inorganic nanoparticle can be understood as a structure obvious to those skilled in the art through a main structure of the terminal group described below. For example, a phosphate structure may be a structure derived from phosphoric acid before forming a chemical bond, such as a covalent bond, with the inorganic nanoparticle.

The aliphatic chain may be a saturated hydrocarbon chain. The saturated hydrocarbon chain may have a straight chain form or a branched chain form. For example, the aliphatic chain may be a $C_2$-$C_6$ saturated hydrocarbon chain, for example —($CH_2$—$CH_2$)—, —($CH_2$—$CH_2$—$CH_2$)—, —($CH_2$—$CH_2$—$CH_2$—$CH_2$)—, —($CH_2$—$CH_2$—$CH_2$—$CH_2$—$CH_2$)—, —($CH_2$—$CH_2$—$CH_2$—$CH_2$—$CH_2$—$CH_2$)—, or the like, for example, a $C_2$-$C_4$ saturated hydrocarbon chain, for example, —($CH_2$—$CH_2$)—, —($CH_2$—$CH_2$—$CH_2$)—, —($CH_2$—$CH_2$—$CH_2$—$CH_2$)—, or the like, but the present disclosure is not limited thereto.

R of the amide group (—N(—C(=O)—R)—) may be a substituent, may be, for example, a $C_1$-$C_{10}$ alkyl group such as a methyl group, an ethyl group, a propyl group, an isopropyl group, a butyl group, an isobutyl group, a tert-butyl group, a sec-butyl group, a 1-methyl-butyl group, a 1-ethyl-butyl group, a pentyl group, an isopentyl group, a neopentyl group, a tert-pentyl group, a hexyl group, a 1-methylpentyl group, a 2-methylpentyl group, a 4-methyl-2-pentyl group, a 3,3-dimethylbutyl group, a 2-ethylbutyl group, a heptyl group, a 1-methylhexyl group, an octyl group, a nonyl group, a decyl group, or the like, for example, a $C_1$-$C_4$ alkyl group such as a methyl group, an ethyl group, a propyl group, an isopropyl group, a butyl group, an isobutyl group, a tert-butyl group, a sec-butyl group, or the like, but the present disclosure is not limited thereto.

For example, the chain of the compound included in each of the first and second dispersants 121 and 131 may include polyethylene or polyoxazoline, and the terminal group may include a silane structure, a phosphate structure, or a carboxyl structure, but the present disclosure is not limited thereto. Fourier Transform Infrared (FT-IR) (Ge Crystal ATR accessory) of THERMO FISCHER's iN 10 model may be used to analyze the structure and functional groups of the compounds included in the first and second dispersants 121 and 131, and NMR of ECX500 II model may be used to determine whether the terminal group is synthesized.

As a non-limiting example, the compound included in the first dispersant 121 may include poly(ethylene glycol)methyl ether as a chain having a repeating unit, and may include a phosphate structure as a terminal group. For example, the first dispersant 121 may include a structure derived from a compound represented by the following Formula 1, but the present disclosure is not limited thereto.

[Formula 1]

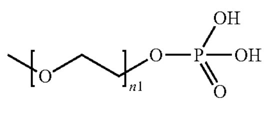

In this case, n1 may be an integer of 15 to 50, and in this case, may have a preferred range of the above-described molecular weight (MW), but the present disclosure is not limited thereto.

As another non-limiting example, the compound included in the first dispersant 121 may include poly(2-ethyl-2-oxazoline) as a chain having a repeating unit, and may include a phosphate structure as a terminal group. For example, the first dispersant 121 may include a structure derived from a compound represented by the following Formula 2, but the present disclosure is not limited thereto.

[Formula 2]

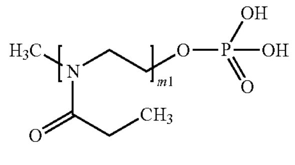

In this case, m1 may be an integer of 5 to 35, and in this case, may have a preferred range of the above-described molecular weight (MW), but the present disclosure is not limited thereto.

Figure 3:
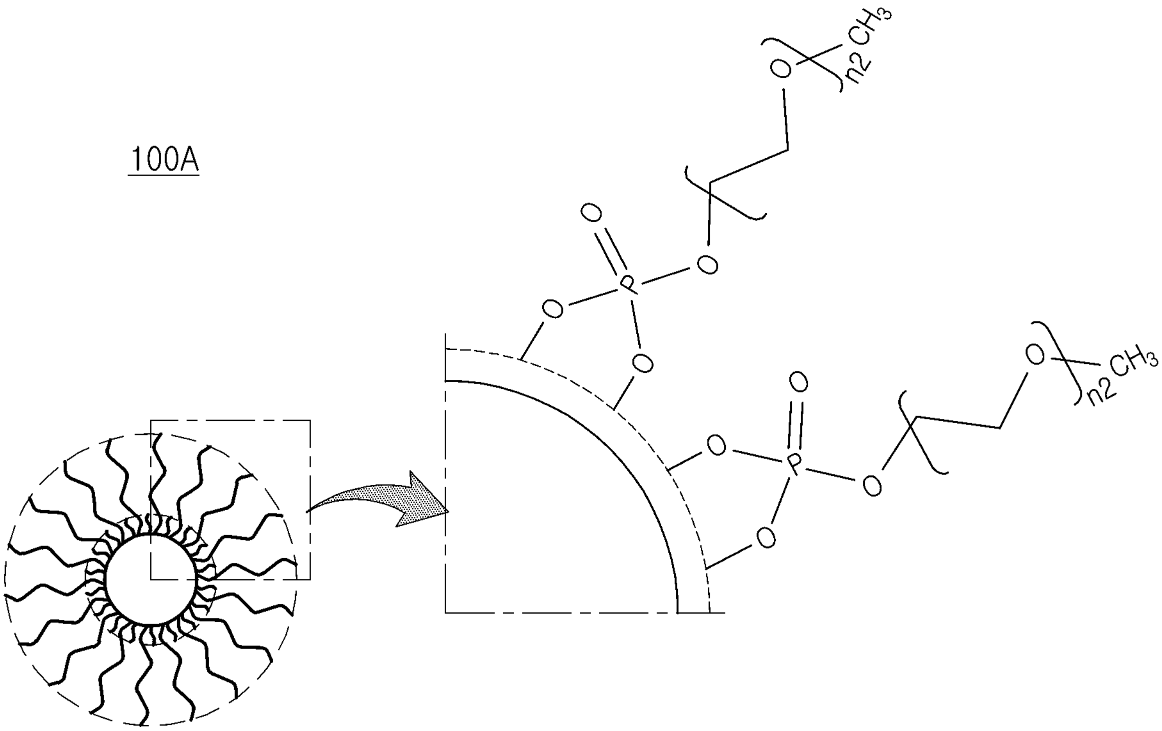
FIGS. 3 and 4 schematically illustrate a connection form of a second dispersant after a second surface-treatment of a surface-treated inorganic nanoparticle, respectively.
Figure 5:
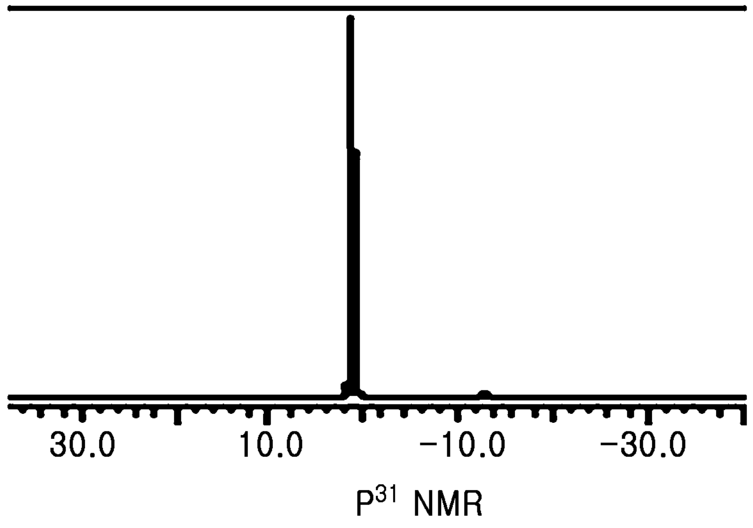
FIG. 5 schematically illustrates an example in which NMR determines whether a terminal group of a surface-treated inorganic nanoparticle is synthesized.

As a non-limiting example, the compound included in the second dispersant 131 may include poly(ethylene glycol) methyl ether as a chain having a repeating unit, and may include a phosphate structure as a terminal group. For example, the second dispersant 131 may include a structure derived from a compound represented by the following Formula 3, and in this case, as illustrated in FIG. 3, a surface-treated inorganic nanoparticle 100A may have a form in which poly(ethylene glycol)methyl ether is connected to each inorganic nanoparticle through a phosphate structure, after a second surface-treatment, but the present disclosure is not limited thereto. Whether or not the phosphate structure is synthesized may be confirmed by P31 NMR, for example, as in FIG. 5.

[Formula 3]

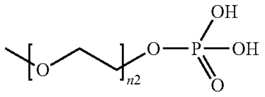

In this case, n2 may be an integer of 110 to 260, and in this case, may have a preferable molecular weight (MW) range in relation to a matrix polymer of a composite film, which will be described later, but the present disclosure is not limited thereto.

Figure 4:
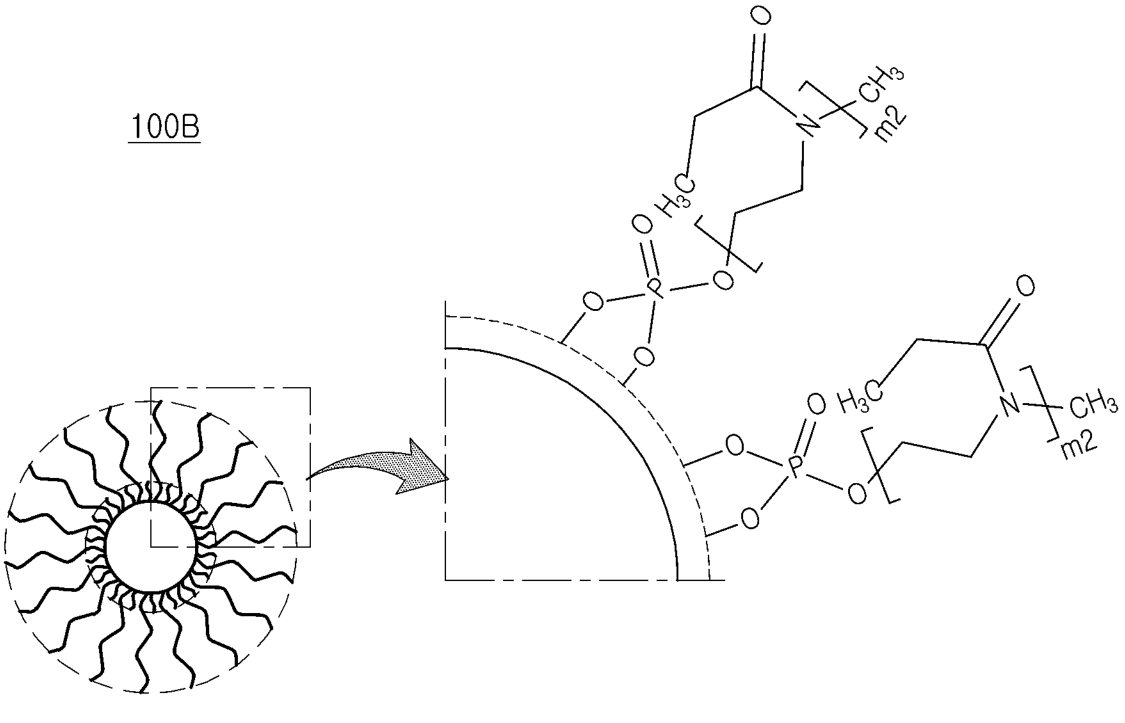

As another non-limiting example, the compound included in the second dispersant 131 may include poly(2-ethyl-2-oxazoline) as a chain having a repeating unit, and may include a phosphate structure as a terminal group. For example, the second dispersant 131 may include a structure derived from a compound represented by the following Formula 4, and in this case, as illustrated in FIG. 4, a surface-treated inorganic nanoparticle 100B may have a form in which poly(2-ethyl-2-oxazoline) is connected to each inorganic nanoparticle through a phosphate structure, after a second surface-treatment, but the present disclosure is not limited thereto. Whether or not the phosphate structure is synthesized may be confirmed by P31 NMR, for example, as in FIG. 5.

[Formula 4]

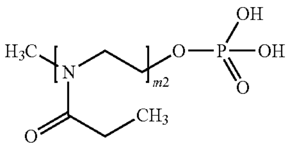

In this case, m2 may be an integer of 110 to 230, and in this case, may have a preferable molecular weight (MW) range in relation to a matrix polymer of a composite film, which will be described later, but the present disclosure is not limited thereto.

A compound including poly(ethylene glycol)methyl ether as a chain having a repeating unit and a phosphate structure as a terminal group may be prepared through the following Scheme 1:

[Scheme 1]

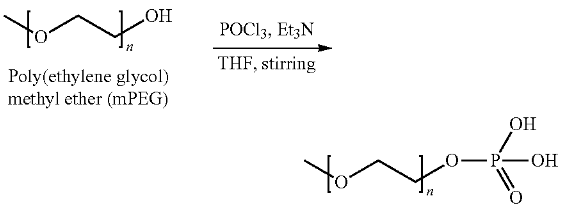

Poly(ethylene glycol) methyl ether (mPEG)

Phosphate terminated mPEG (pmPEG)

In this case, n may be n1 or n2, and in this case, may have a preferred range of the above-described molecular weight (MW), but the present disclosure is not limited thereto.

A compound including poly(2-ethyl-2-oxazoline) as a chain having a repeating unit and a phosphate structure as a terminal group may be prepared through the following Scheme 2:

[Scheme 2]

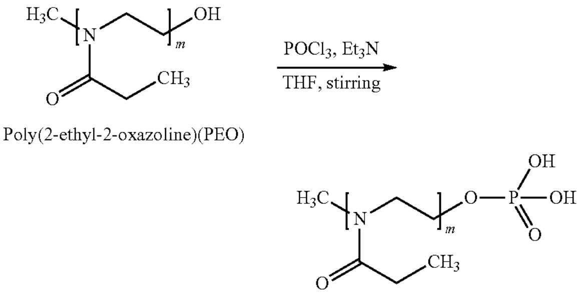

Poly(2-ethyl-2-oxazoline)(PEO)

Phosphate terminated p2E2O (pPEO)

In this case, m may be m1 or m2, and in this case, may have a preferred range of the molecular weight (MW) described above, but the present disclosure is not limited thereto.

Figure 6:
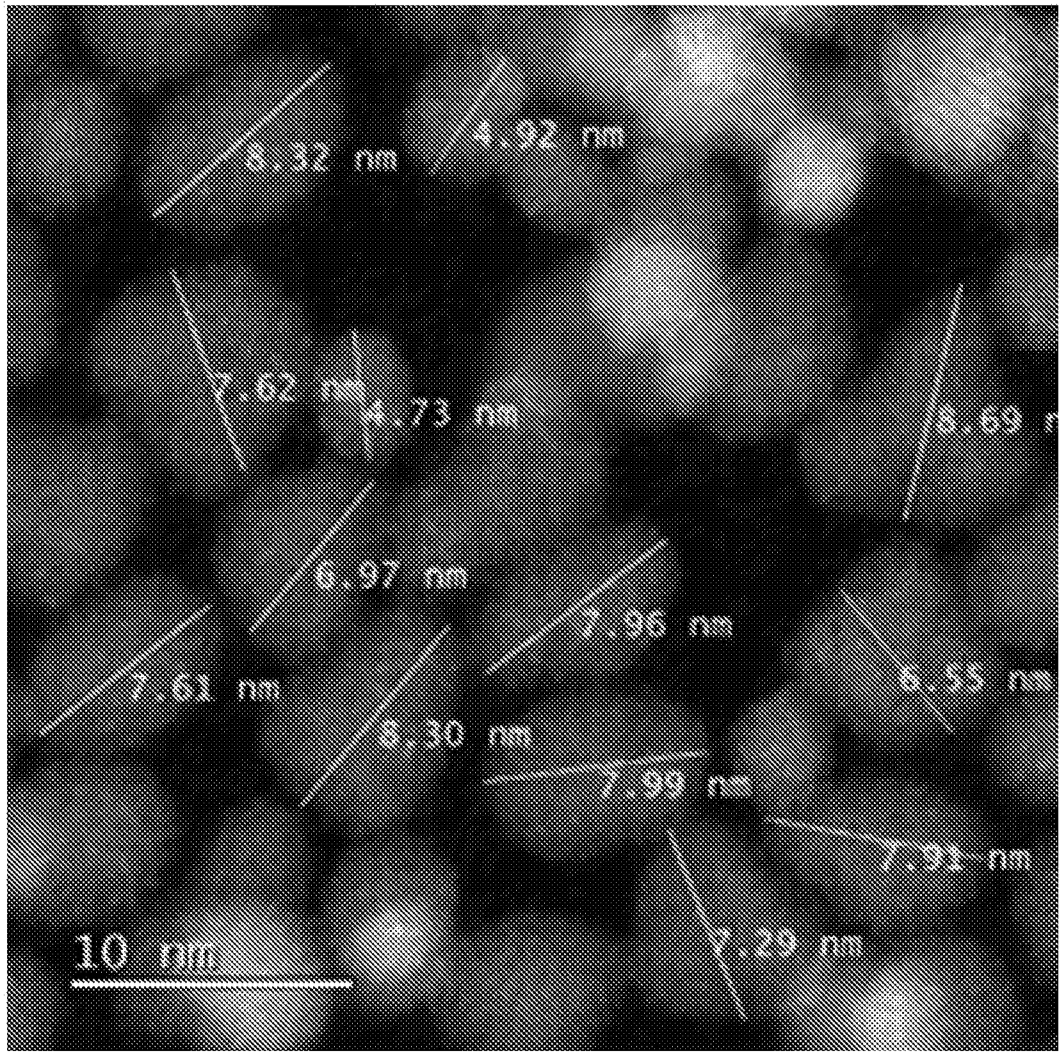
FIG. 6 schematically illustrates an example of measuring a particle size of a surface-treated inorganic nanoparticle by TEM.

The surface-treated inorganic nanoparticle 100 may have, for example, a particle size of 1 nm to 30 nm, for example, 3 nm to 15 nm, as in FIG. 6. When the particle size is larger than the above ranges, transmittance due to particle scattering may be reduced, making it difficult to make a transparent material. When the particle size is smaller than the above ranges, it may be difficult to control agglomeration. The particle size may be measured by TEM of JEOL's JEM-ARM200F model.

Composite Film

A composite film according to an example may include a polymer and the above-described surface-treated inorganic nanoparticle dispersed in the polymer. The composite film according to an example may be manufactured by complexing the polymer and the above-described surface-treated inorganic nanoparticle. For example, the composite film may be prepared by applying a composition including the above-described surface-treated inorganic nanoparticle to the polymer, drying a solvent, and performing thermal compression bonding. Alternatively, the composite film may be prepared by adding the polymer to a composition including the above-described surface-treated inorganic nanoparticle, drying a solvent, and performing thermal compression bonding. After the thermal compression bonding, the composite film may be in a thick film state. The polymer and the above-described surface-treated inorganic nanoparticle may be bonded to each other by a hydrogen bond or the like.

The polymer may be used as a material for an optical lens for a camera module, and thus may be a polymer having a high refractive index. For example, the polymer may be a thermoplastic polymer having a fluorene group, specifically, polyester having a fluorene group, polycarbonate having a fluorene group, and the like, but the present disclosure is not limited thereto. The inorganic nanoparticle, such as a zirconia nanoparticle, may be relatively hydrophilic, and may be more easily bonded to such a thermoplastic polymer, such as polyester, polycarbonate, or the like by a hydrogen bond.

If a molecular weight (MW) of the polymer is P and a molecular weight (MW) of the above-described second dispersant is N, a composite film according to an example has a P/N of 0.5 to 8, for example, about 1 to 4. In this case, it is possible to secure an optimal dispersion state. When a value of P/N is lower than the above ranges, a second surface-treatment molecular weight may be too large to secure a dispersion density to suppress nanoparticle aggregation. When a value of P/N is higher than the above ranges, a second surface-treatment period may be too short not to mix well with a matrix polymer, to occur phase separation. As a non-limiting example, the molecular weight (MW) of an injectable optical polymer may be about 10000 to 30000, and the second dispersant may have a range in which the molecular weight (MW) satisfies the above-described P/N range, but the present disclosure is not limited thereto.

The refractive index may be changed, depending on amounts of surface-treated inorganic nanoparticles dispersed in the polymer. For example, when a zirconia nanoparticle having a refractive index of about 2.1 is dispersed in an optical polymer having a refractive index of about 1.68 after double surface-treatment, a highly transparent composite film having a refractive index of about 1.7 or more may be manufactured. The surface-treated nanoparticles may be dispersed in an amount of 1 wt % to 90 wt %, but an amount of about 5 wt % to 70 wt % is more preferable to increase a refractive index and facilitate thermoformability. The refractive index may be a value measured at a wavelength of 550 nm, and may be measured using a METRICON 2010M model Prism Coupler.

Figure 7:
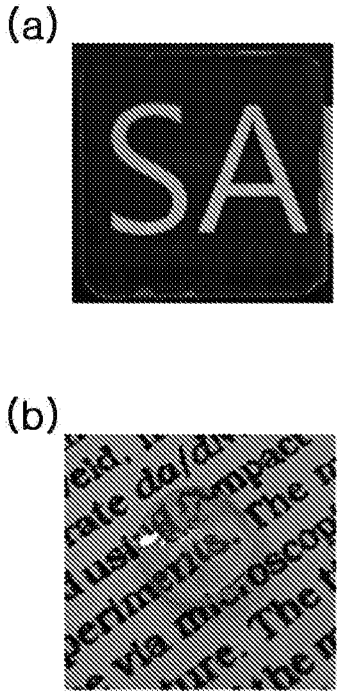
FIG. 7 schematically illustrates various examples of a composite film.

The composite film may be manufactured as a thick film type having a thickness of approximately 1 mm as in portion (a) of FIG. 7, or as an aspherical lens type as in portion (b) of FIG. 7, but the present disclosure is not limited thereto.

The present disclosure is not limited to the optical lens for the camera module, and may be, of course, also applicable to other optical functional materials, such as AR glass lenses, meta lenses, and the like.

EXPERIMENTAL EXAMPLE

Preparation Example 1

Surface-treatment of zirconia nanoparticles was performed using a dispersant having a molecular weight (MW) of 1000, containing polyethylene glycol as a chain and a carboxyl structure (e.g., carboxylic acid) as a terminal group, to obtain zirconia nanoparticles having a single surface-treatment structure. Next, a nano-sol containing the surface-treated zirconia nanoparticles was mixed with a solution containing thermoplastic polyester containing fluorene having a molecular weight (MW) of 12000, to form a composite sol in which the surface-treated zirconia nanoparticles were dispersed in the thermoplastic polyester, the solvent was dried to form a thin film, and the thin film was then thermocompressed, to prepare a composite film as a thick film having a thickness of 1 mm.

Preparation Example 2

In Preparation Example 2, after the surface-treatment of the zirconia nanoparticles, a composite film having a thickness of approximately 1 mm was prepared in the same manner as in Preparation Example 1, except that second surface-treatment was performed using a second dispersant having a molecular weight (MW) of 5000, containing poly (ethylene glycol)methyl ether as a chain and a phosphate structure (e.g., phosphoric acid) as a terminal group, to prepare zirconia nanoparticles having a double surface-treatment structure.

Preparation Example 3

First surface-treatment of zirconia nanoparticles was performed using a first dispersant having a molecular weight (MW) of 1000, containing polyethylene glycol as a chain and a carboxyl structure (e.g., carboxylic acid) as a terminal group, and then second surface-treatment of zirconia nanoparticles was performed using a second dispersant having a molecular weight (MW) of 1000, containing polydimethylsiloxane as a chain and a phosphate structure (e.g., phosphoric acid) as a terminal group, to obtain zirconia nanoparticles having a double surface-treatment structure. Next, the surface-treated zirconia nanoparticles were dispersed in a thermoplastic polyester containing fluorene having a molecular weight (MW) of 12000, to prepare a composite film.

Preparation Example 4

In Preparation Example 4, a composite film was prepared in the same manner as in Preparation Example 3, except that a compound having a molecular weight (MW) of 10000, containing polydimethylsiloxane as a chain and a phosphate structure (e.g., phosphoric acid) as a terminal group, was used as a second dispersant.

Preparation Example 5

In Preparation Example 5, a composite film was prepared in the same manner as in Preparation Example 3, except that a compound having a molecular weight (MW) of 10000, containing poly(ethylene glycol)methyl ether as a chain and a phosphate structure (e.g., phosphoric acid) as a terminal group, was used as a second dispersant.

Preparation Example 6

In Preparation Example 6, a composite film was prepared in the same manner as in Preparation Example 3, except that a compound having a molecular weight (MW) of 10000, containing poly(2-ethyl-2-oxazoline) as a chain and a phosphate structure (e.g., phosphoric acid) as a terminal group, was used as a second dispersant.

In Preparation Example 6, a composite film was prepared in the same manner as in Preparation Example 3, except that a compound having a molecular weight (MW) of 10000 including poly(2-ethyl-2-oxazoline) as a chain as the second dispersant and a phosphate structure (e.g., phosphoric acid) as a terminal group was used.

Preparation Example 7

A first surface-treatment of zirconia nanoparticles was performed using a first dispersant having a molecular weight (MW) of 1000, containing poly(ethylene glycol)methyl ether as a chain and a phosphate structure (e.g., phosphoric acid) as a terminal group, and then second surface-treatment of zirconia nanoparticles was performed using a second dispersant having a molecular weight (MW) of 1000, containing poly(ethylene glycol)methyl ether as a chain and a phosphate structure (e.g., phosphoric acid) as a terminal group, to obtain zirconia nanoparticles having a double surface-treatment structure. Next, the surface-treated zirconia nanoparticles were dispersed in a thermoplastic polyester containing fluorene having a molecular weight (MW) of 12000, to prepare a composite film.

Preparation Example 8

In Preparation Example 8, a composite film was prepared in the same manner as in Preparation Example 7, except that second surface-treatment of zirconia nanoparticles was performed using a second dispersant having a molecular weight (MW) of 5000, containing poly(ethylene glycol)methyl ether as a chain and a phosphate structure (e.g., phosphoric acid) as a terminal group.

Preparation Example 9

In Preparation Example 9, a composite film was prepared in the same manner as in Preparation Example 7, except that second surface-treatment of zirconia nanoparticles was performed using a second dispersant having a molecular weight (MW) of 10000, containing poly(ethylene glycol)methyl ether as a chain and a phosphate structure (e.g., phosphoric acid) as a terminal group.

Preparation Example 10

In Preparation Example 10, a composite film was prepared in the same manner as in Preparation Example 7, except that second surface-treatment of zirconia nanoparticles was performed using a second dispersant having a molecular weight (MW) of 20000, containing poly(ethylene glycol)methyl ether as a chain and a phosphate structure (e.g., phosphoric acid) as a terminal group.

Example 1

Figure 8:
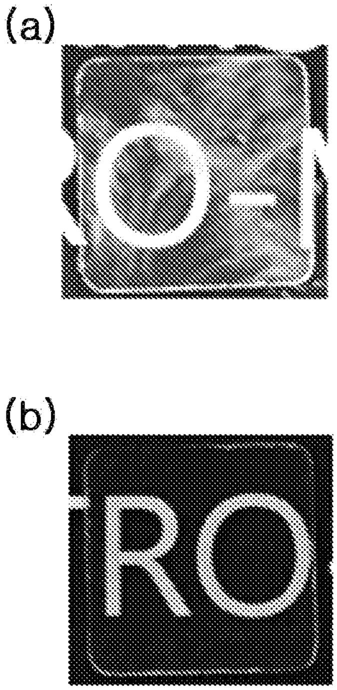
FIG. 8 schematically illustrates transparency of a composite film according to a surface-treatment process of an inorganic nanoparticle.

Transparency of the composite films of Preparation Examples 1 and 2 was visually observed, and results therefrom were shown in portions (a) and (b) of FIG. 8, respectively. Referring to the drawings, as in Preparation Example 1, when using the single surface-treated zirconia nanoparticle, the nanoparticles were aggregated to obtain an opaque composite film. As in Preparation Example 2, when using the double surface-treated zirconia nanoparticle, a transparent composite film was obtained.

Figure 9:
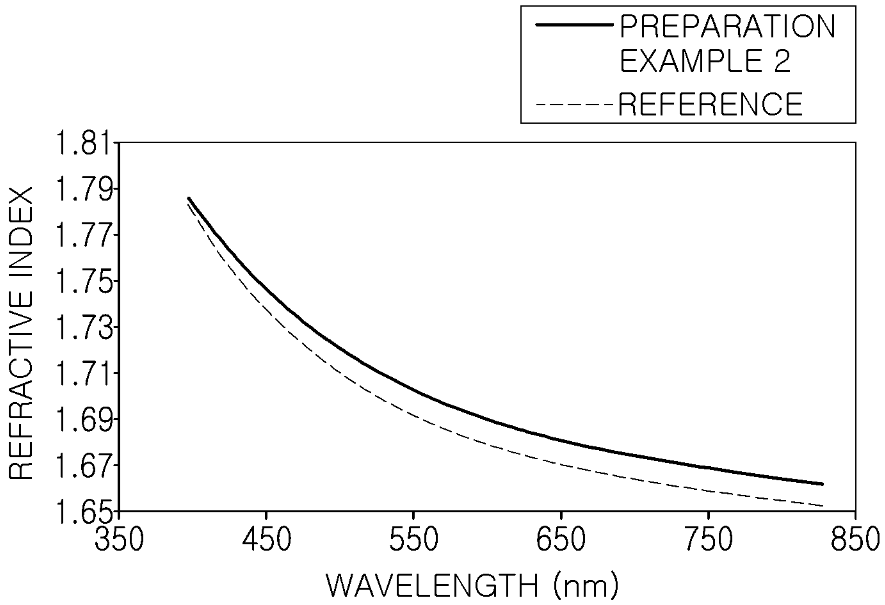
FIG. 9 schematically illustrates a refractive index according to a wavelength of a composite film prepared by dispersing an inorganic nanoparticle of a double surface-treatment structure, as compared to a reference.

In particular, as illustrated in FIG. 9, the composite film of Preparation Example 2 had a refractive index of about 1.70 measured at a wavelength of 550 nm, and the refractive index was higher than a refractive index of 1.68 in a reference composite film. In this case, the reference composite film refers to a composite film having a thickness of approximately 1 mm, obtained by performing thermal compression bonding, after drying a solvent only in a solution containing a thermoplastic polyester containing fluorene having a molecular weight (MW) of 12000, without dispersion of zirconia nanoparticles. The refractive index may be measured using a Prism Coupler of METRICON 2010M model.

Figure 10:
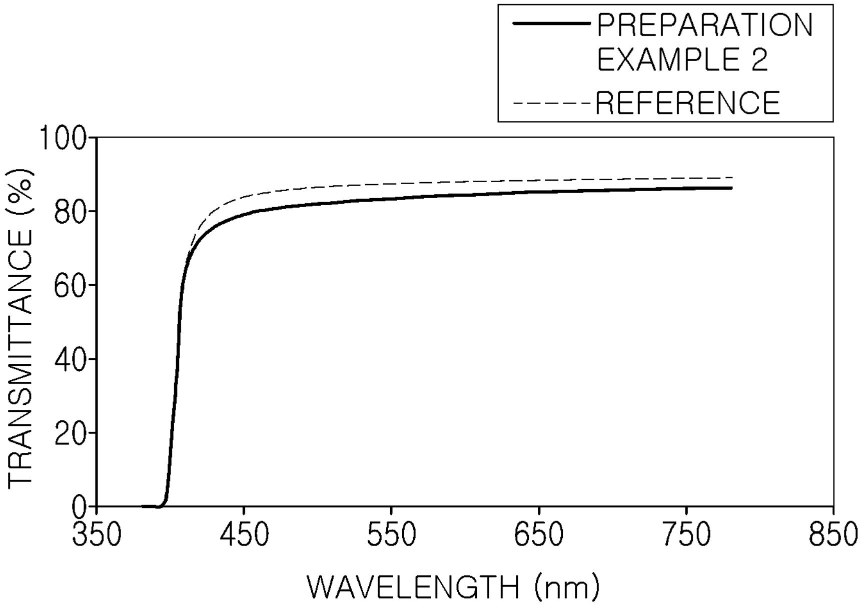
FIG. 10 schematically illustrates transmittance according to a wavelength of a composite film prepared by dispersing an inorganic nanoparticle of a double surface-treatment structure, as compared to a reference.

In addition, as illustrated in FIG. 10, the composite film of Preparation Example 2 had a transmittance of about 83% measured at a wavelength of 550 nm, to secure a high transmittance of 70% or more, similar to a reference composite film having a transmittance of about 87%. In this case, the reference composite film refers to a composite film having a thickness of approximately 1 mm, obtained by performing thermal compression bonding, after drying a solvent only in a solution containing a thermoplastic polyester containing fluorene having a molecular weight (MW) of 12000, without dispersion of zirconia nanoparticles. The transmittance and haze may be measured using a UV-Vis PERKINELMER Lambda 1050 model Spectrometer.

Example 2

Figure 11:
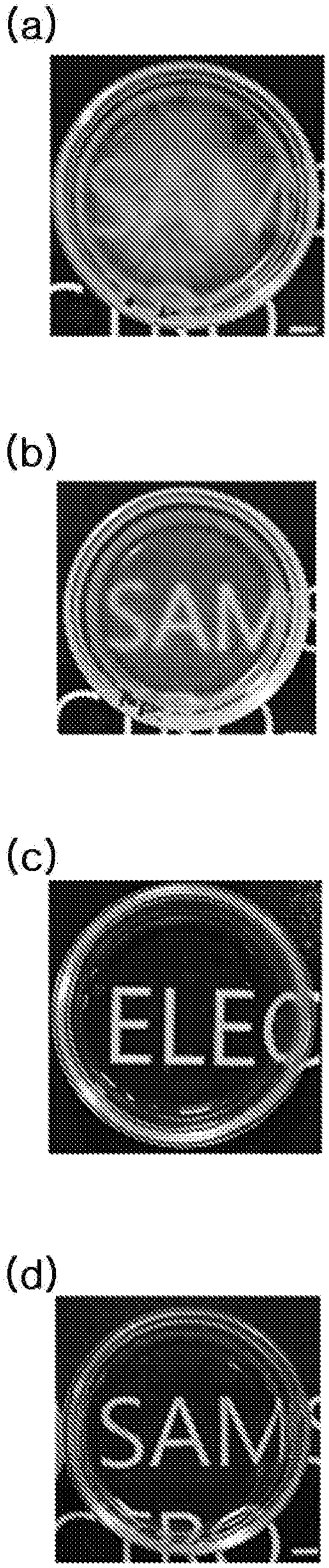
FIG. 11 schematically illustrates transparency of a composite film according to a type of a second dispersant for second surface-treatment of an inorganic nanoparticle.

Transparency of the composite films of Preparation Examples 3 to 6 was visually observed, and results therefrom are shown in portions (a) to (d) of FIG. 11, respectively. Referring to the drawings, as in Preparation Examples 3 and 4, when the second dispersant was a compound not containing an aliphatic chain, affinity with the polymer was lowered and the particles tended to agglomerate. In particular, this tendency was greater when the molecular weight (MW) of the second dispersant was low. As in Preparation Examples 5 and 6, when the second dispersant was a compound containing an aliphatic chain, a transparent composite film was obtained.

Example 3

Figure 12:
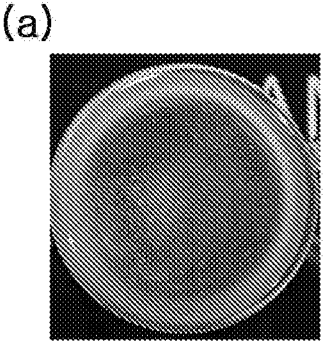
FIG. 12 schematically illustrates transparency of a composite film according to a molecular weight of a second dispersant for second surface-treatment of an inorganic nanoparticle.
Figure 12:
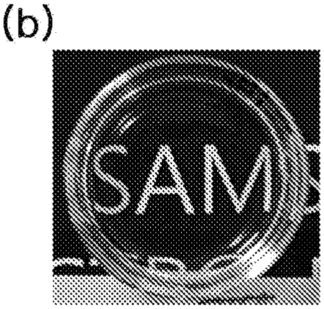
Figure 12:
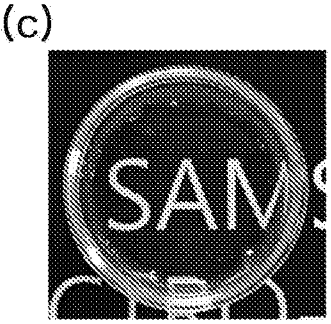
Figure 12:
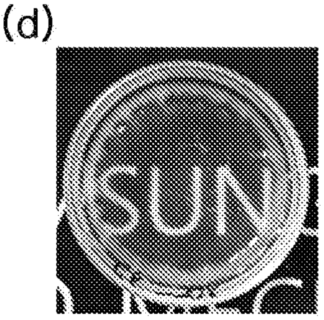

Transparency of the composite films of Preparation Examples 7 to 10 was visually observed, and results therefrom were shown in portions (a) to (d) of FIG. 12, respectively. Referring to the drawings, as in Preparation Example 7, when P/N was too large as 12, and, as in Preparation Example 10, when P/N was too small as 0.6, an opaque composite film was obtained due to aggregation of zirconia nanoparticles. In particular, this tendency was greater when the molecular weight (MW) of the second dispersant was small. As in Preparation Examples 8 and 9, when P/N satisfies the above-mentioned preferred range, a transparent composite film was obtained.

According to the present disclosure, a surface-treated inorganic nanoparticle, such as a surface-treated zirconia nanoparticle, may be uniformly distributed in an optical polymer, such as polyester and/or polycarbonate, containing fluorene. In particular, a multiple surface-treated structure for suppressing aggregation of a zirconia nanoparticle and improving miscibility with a polymer, for example, a double surface-treated structure may be introduced, which may have a more excellent effect. Therefore, for example, functionalization on a surface of a zirconia nano-sol prepared using a zirconium precursor, and complexing the same with a high refractive polymer, may be applied to electrical, electronic, and optical functional materials.

The expression “an example” used in the present disclosure does not mean the same embodiment as each other, and may be provided to emphasize and explain different unique features. However, the examples presented above may not be excluded from being implemented in combination with features of other examples. For example, even when a matter described in a particular example may not be described in another example, it can be understood as a description related to another example unless a description contradicts the matter in the other example.

The terminology used in the present disclosure may be used to describe an example only, and may not be intended to limit the present disclosure. In this case, the singular expression may include the plural expression, unless the context clearly indicates otherwise.

As one effect of various effects of the present disclosure, a surface-treated inorganic nanoparticle that may be uniformly distributed in an optical polymer, and a composite film in which the surface-treated inorganic nanoparticle is dispersed in the optical polymer, for example, a composite film for an optical lens of a camera module, may be provided.

While specific example embodiments have been shown and described above, it will be apparent after an understanding of this disclosure that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A composite film comprising:

a polymer;

an inorganic nanoparticle dispersed in the polymer;

a first dispersant connected to the inorganic nanoparticle; and a second dispersant connected to the inorganic nanoparticle, wherein a molecular weight (MW) of the first dispersant is different from a molecular weight (MW) of the second dispersant, wherein the first dispersant comprises a structure derived from a compound represented by the following Formula 1 or a compound represented by Formula 2:

[Formula 1]

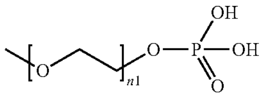

-continued

[Formula 2]

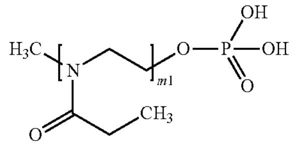

where n1 is an integer of 15 to 50, and m1 is an integer of 5 to 35, wherein the second dispersant comprises a structure derived from a compound represented by the following Formula 4:

[Formula 4]

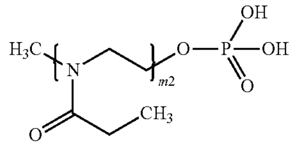

where m2 is an integer of 110 to 230, and wherein, when a molecular weight (MW) of the polymer is P and a molecular weight (MW) of the second dispersant is N, P/N is 1 to 4.

2. The composite film of claim 1, wherein a first surface-treatment layer is disposed on the inorganic nanoparticle, and wherein a second surface-treatment layer is disposed on the first surface-treatment layer.

3. The composite film of claim 2, wherein the first and second surface-treatment layers comprise the first and second dispersants, respectively, and wherein a portion of the second dispersant passes through the first surface-treatment layer.

4. The composite film of claim 1, wherein the molecular weight (MW) of the polymer is 10000 to 30000.

5. The composite film of claim 1, wherein the molecular weight (MW) of the first dispersant is 800 to 1800.

6. The composite film of claim 1, wherein the polymer comprises polyester containing fluorene, or polycarbonate containing fluorene.

7. The composite film of claim 1, wherein the inorganic nanoparticle comprises zirconia ($ZrO_2$), titania ($TiO_2$), barium titanate (BTO), or zinc sulfide (ZnS).

8. The composite film of claim 1, wherein a particle size of the surface-treated inorganic nanoparticle is 3 nm to 15 nm.

9. A lens comprising the composite film of claim 1.

* * * * *